United States Patent
Erickson

(10) Patent No.: US 10,279,638 B2
(45) Date of Patent: May 7, 2019

(54) TRANSFER DUMP TRUCK SAFETY LIGHT

(71) Applicant: Eric Dale Erickson, Washougal, WA (US)

(72) Inventor: Eric Dale Erickson, Washougal, WA (US)

(*) Notice: Subject to any disclaimer, the term of this patent is extended or adjusted under 35 U.S.C. 154(b) by 409 days.

(21) Appl. No.: 14/930,639

(22) Filed: Nov. 2, 2015

(65) Prior Publication Data
US 2016/0129742 A1 May 12, 2016

Related U.S. Application Data

(60) Provisional application No. 62/076,333, filed on Nov. 6, 2014.

(51) Int. Cl.
B60D 1/18 (2006.01)
B60D 1/58 (2006.01)
B60D 1/145 (2006.01)
B60Q 1/26 (2006.01)
B60Q 1/30 (2006.01)

(52) U.S. Cl.
CPC ............ B60D 1/58 (2013.01); B60D 1/145 (2013.01); B60Q 1/2657 (2013.01); B60Q 1/2692 (2013.01); B60Q 1/305 (2013.01)

(58) Field of Classification Search
CPC . B60D 1/145; B60D 1/58; B60D 1/18; B60D 1/182; B60D 1/187; B60D 1/28; B60D 1/24; B60Q 1/2657; B60Q 1/2692; B60Q 1/305
USPC ............................................. 40/590; 362/485
See application file for complete search history.

(56) References Cited

U.S. PATENT DOCUMENTS

| | | | | | |
|---|---|---|---|---|---|
| 3,153,398 | A | * | 10/1964 | La Verne Runkle | B60J 9/02 116/28 R |
| 3,783,267 | A | * | 1/1974 | Thomas | B60P 3/18 340/472 |
| 4,087,785 | A | * | 5/1978 | Dodich | B60Q 1/305 254/387 |
| 4,240,647 | A | * | 12/1980 | Lewis | B60D 1/155 280/404 |
| 4,413,451 | A | * | 11/1983 | Featherstone | B60Q 1/2657 277/553 |
| 5,475,386 | A | * | 12/1995 | Luoma | G08G 1/0955 116/63 P |
| 5,524,398 | A | * | 6/1996 | Miller | B60P 3/18 182/207 |
| 5,558,424 | A | * | 9/1996 | Zeligson | B60Q 1/2611 362/286 |
| 5,572,837 | A | * | 11/1996 | Featherstone | B60P 3/18 362/385 |

(Continued)

Primary Examiner — Joseph M Rocca
Assistant Examiner — Daniel S Yeagley
(74) Attorney, Agent, or Firm — Rylander & Associates, PC; Philip R. M. Hunt

(57) ABSTRACT

A dump truck safety light device for a transfer dump truck system. The dump truck safety light device is coupled to a trailer reach or tongue. The dump truck safety light device is configured to be in a raised configuration or in a lowered configuration. The dump truck safety light device announces the presence of a trailer reach to another vehicle that is following slightly behind a dump truck in the next lane to the left. Without the dump truck safety light device, the trailer reach would be hidden to the driver of the other vehicle in a blind spot created by the passenger door of the other vehicle.

20 Claims, 5 Drawing Sheets

(56) References Cited

U.S. PATENT DOCUMENTS

| | | | | |
|---|---|---|---|---|
| 5,743,635 A * | 4/1998 | Hulse | ............... | B60Q 1/2657 |
| | | | | 362/294 |
| 6,805,462 B1 * | 10/2004 | Smith | ............... | B60P 3/14 |
| | | | | 362/192 |
| 6,886,968 B1 * | 5/2005 | Hamelink | ............... | B60D 1/58 |
| | | | | 280/163 |
| 7,385,526 B1 * | 6/2008 | Bullard | ............... | B60Q 1/2657 |
| | | | | 340/425.5 |
| 7,752,991 B2 * | 7/2010 | Graves | ............... | B60Q 7/02 |
| | | | | 116/28 R |
| 8,072,345 B2 * | 12/2011 | Gallo | ............... | B60Q 1/52 |
| | | | | 340/472 |
| 8,465,047 B2 * | 6/2013 | Groeneweg | ............... | E01F 15/148 |
| | | | | 280/404 |
| 8,733,963 B2 * | 5/2014 | Sharpley | ............... | B60P 3/18 |
| | | | | 362/183 |
| 9,157,621 B2 * | 10/2015 | Na | ............... | E02F 9/0858 |
| 9,791,118 B2 * | 10/2017 | Carpoff | ............... | F21S 9/037 |
| 10,035,390 B1 * | 7/2018 | Schultz | ............... | B60D 1/58 |
| 2005/0047156 A1 * | 3/2005 | Cullinan | ............... | B60P 3/10 |
| | | | | 362/485 |
| 2005/0185412 A1 * | 8/2005 | Hutchinson | ............... | B60Q 1/18 |
| | | | | 362/485 |
| 2006/0213167 A1 * | 9/2006 | Koselka | ............... | A01D 46/30 |
| | | | | 56/10.2 A |
| 2008/0040959 A1 * | 2/2008 | Schultz | ............... | B60D 1/58 |
| | | | | 40/582 |
| 2015/0000168 A1 * | 1/2015 | Maus | ............... | B60D 1/04 |
| | | | | 40/590 |

\* cited by examiner

TRANSFER DUMP TRUCK SAFETY LIGHT

CROSS-REFERENCE TO RELATED APPLICATION

This application claims the benefit of U.S. Provisional Application No. 62/076333, 06-NOV-2014, incorporated herein by reference.

FIELD OF THE INVENTION

The present invention relates to truck equipment. More particularly, the present invention relates to truck safety equipment.

BACKGROUND

Trucks such as dump trucks can be used to haul bulk materials such as dirt, gravel and rock. These materials can be quite heavy. Heavy loads, concentrated on a small wheel base can damage roads and bridges. Government regulations limit the loads that can be carried typically based on the length of the truck (including any trailer) and number of axles. To maximize the amount of load that can be carried by a truck system, truck designers will often add a trailer to increase the length of the truck system, thereby distributing the weight of the load over a greater length. Due to the nature of the weight limit formulas mandated by the government regulations, allowable load weight can be maximized by concentrating load at opposite ends of the truck system, with little or no load in the middle. The result is a truck system comprising a truck with a first load box followed by a trailer with a second load box, the trailer connected to the truck by a long beam called a reach or a tongue.

A transfer dump truck system is a dump truck pulling a separate trailer with a load box that can be moved forward on a frame of the trailer and into the load box of the dump truck. When the transfer dump truck system arrives at its destination, the operator detaches the trailer, drives the dump truck separately to a dump zone where the load is needed and dumps it using the dump cylinder of the dump truck to tilt the dump truck load box. The operator then backs the dump truck over the trailer reach until the back of the dump truck is close to the trailer load box. A load box transfer mechanism pulls the trailer load box into the dump truck load box, which is slightly larger. The load box transfer mechanism is typically a small motor (electrical, pneumatic, or hydraulic). The trailer load box typically moves on small wheels on rails or within guides. The operator then drives to the dump zone and dumps the trailer load box (nested inside the dump truck load box) using the dump truck's dump cylinder. The operator then backs up again over the trailer reach and uses the load box transfer mechanism to move the trailer load box back onto the trailer. This arrangement saves weight and cost, as the load box transfer mechanism is typically much lighter and cheaper than a separate dump cylinder on the trailer to tilt the trailer load box.

The reach of a transfer dump truck system is typically very low to the ground in order to facilitate the dump truck backing over it, as it must to transfer the trailer load box into the dump truck load box. The long, low trailer reach is necessary, but creates a particular problem. When traveling on the highway, the long, low trailer reach is not readily observable to other vehicles on the highway. This is especially a problem when there is another vehicle traveling in the same direction as the transfer dump truck system in a traffic lane to the left of the lane in which the transfer dump truck system is travelling. The driver of the other vehicle, when directly alongside the trailer reach, usually cannot see it, as the view of it is blocked by the passenger side door. To the driver of the other vehicle, the transfer dump truck system may look like two separate vehicles, with an empty space in-between. Worse, positioned alongside the trailer reach, the driver of the other vehicle is likely to have the trailer in a blind spot and not see it at all. This is an unsafe condition as the driver of the other vehicle may attempt to change lanes into the same lane right behind the dump truck, not realizing there is a trailer behind the dump truck. What is needed is a way to warn drivers of vehicles alongside a transfer dump truck system of the presence of a trailer and trailer reach behind the dump truck.

SUMMARY

A dump truck safety light device for a transfer dump truck system is described herein. The dump truck safety light device has a light on an arm that can be raised or lowered by an actuator. The dump truck safety light device is coupled to a trailer reach or tongue. The dump truck safety light device is configured to be in a raised configuration or in a lowered configuration. The dump truck safety light device announces the presence of a trailer reach to another vehicle that is following slightly behind a dump truck in the next lane to the left. Without the dump truck safety light device, the trailer reach would be hidden to the driver of the other vehicle in a blind spot created by the passenger door of other vehicle.

BRIEF DESCRIPTION OF THE DRAWINGS

The present invention will be described by way of exemplary embodiments, but not limitations, illustrated in the accompanying drawings in which like references denote similar elements, and in which.

The accompanying drawings, which are incorporated into and constitute a part of this specification, illustrate one or more embodiments of the invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art will recognize that numerous modifications and changes may be made to the exemplary embodiment(s) without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the exemplary embodiment(s) is essential. Other embodiments are possible, their specific designs depending upon the particular application. As such, the scope of the invention should not be limited by the particular embodiments herein described but should be defined only by the appended claims and equivalents thereof.

EXEMPLARY EMBODIMENT

Figure 1:
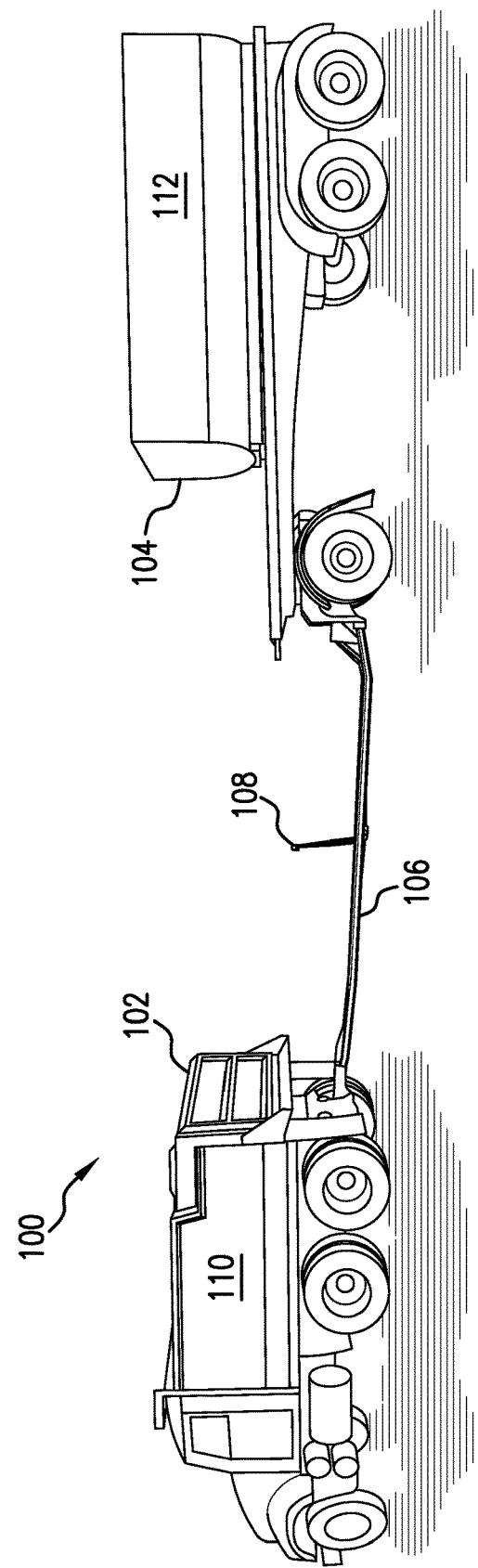
FIG. 1 shows a side perspective view of an exemplary embodiment of a transfer dump truck system with a transfer dump truck safety light device.

FIG. 1 shows a side perspective view of an exemplary embodiment of a transfer dump truck system 100 with a transfer dump truck safety light device 108. The transfer dump truck system 100 comprises a dump truck 102 and a trailer 104. The dump truck 102 has a dump truck load box 110 and the trailer 104 has a trailer load box 112. The trailer 104 has a trailer reach 106 configured for connecting the trailer 104 to the dump truck 102. The trailer reach 106 is typically long to facilitate distribution of weight over a longer wheel base and is typically low to permit the dump truck 102 to back over it, which allows the trailer load box 112 to be moved into the dump truck load box 110. The dump truck safety light device 108 is coupled to the trailer reach 106, typically near the middle of the trailer reach 106.

Figure 2:
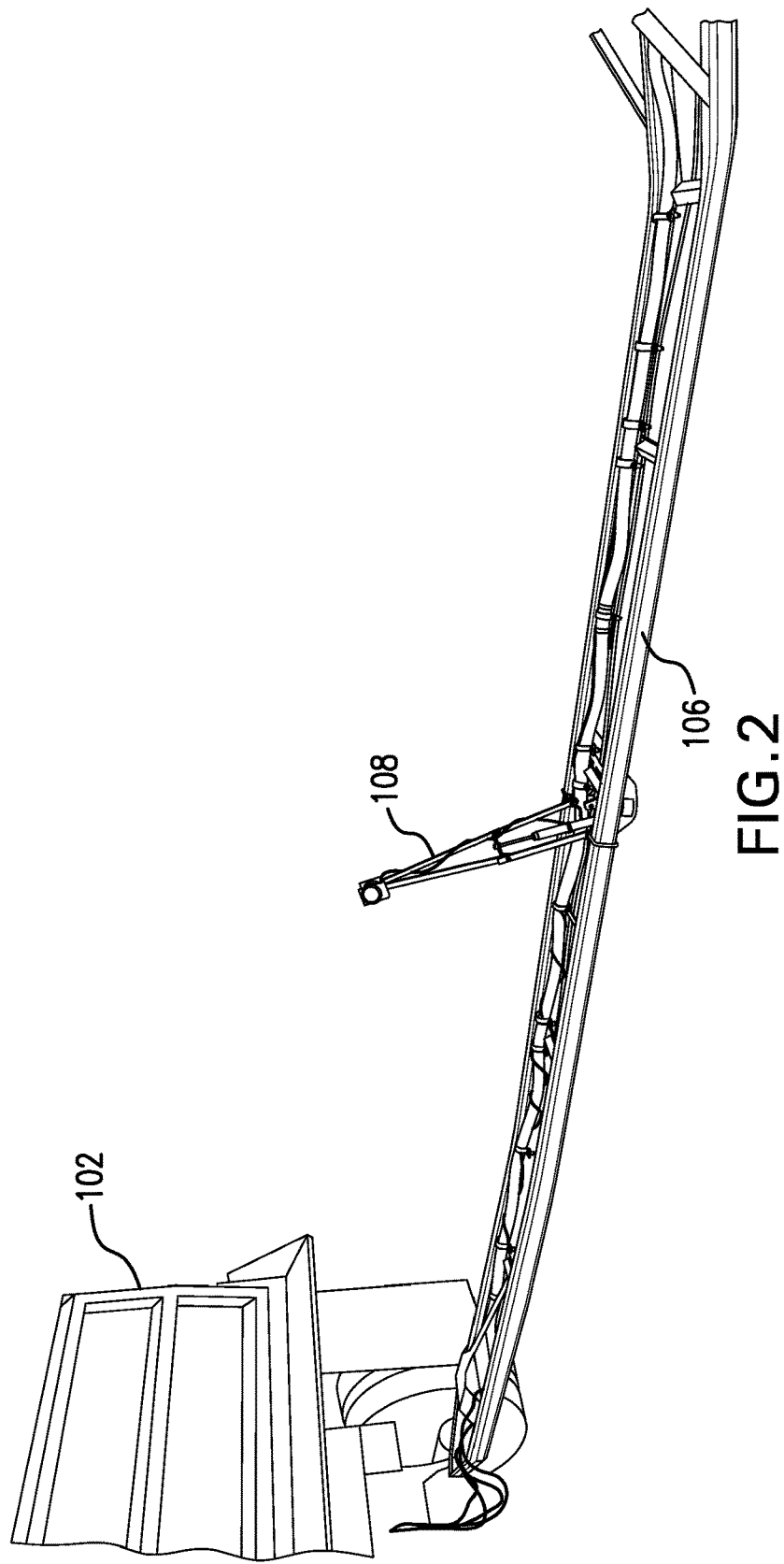
FIG. 2 shows a side perspective view of the trailer reach with the dump truck safety light device in the raised configuration.
Figure 3:
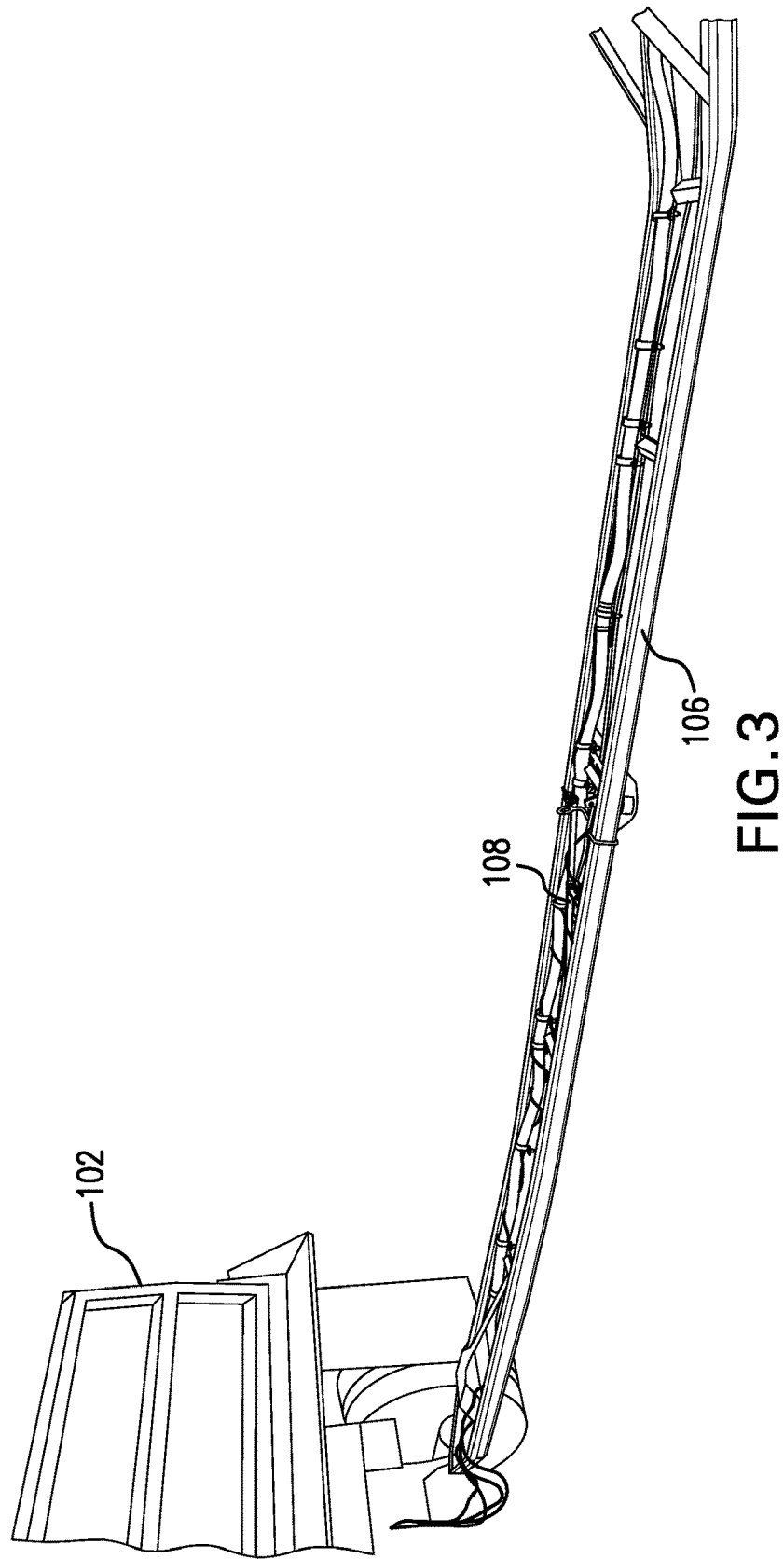
FIG. 3 shows a side perspective view of the trailer reach with the dump truck safety light device in the lowered configuration.

The exemplary embodiment of dump truck safety light device 108 has a raised configuration and a lowered configuration. FIG. 2 shows a side perspective view of the trailer reach 106 with the dump truck safety light device 108 in the raised configuration. FIG. 3 shows a side perspective view of the trailer reach 106 with the dump truck safety light device 108 in the lowered configuration. When in the lowered configuration, the dump truck safety light device 108 provides a visual indication to other vehicles of the presence of the trailer reach 106. When in the lowered configuration, the dump truck safety light device 108 fits within the trailer reach 106, so that it does not provide any obstacle for the dump truck 102 when it is backing over the trailer reach 106 in preparation for transferring the trailer load box 112.

Figure 4:
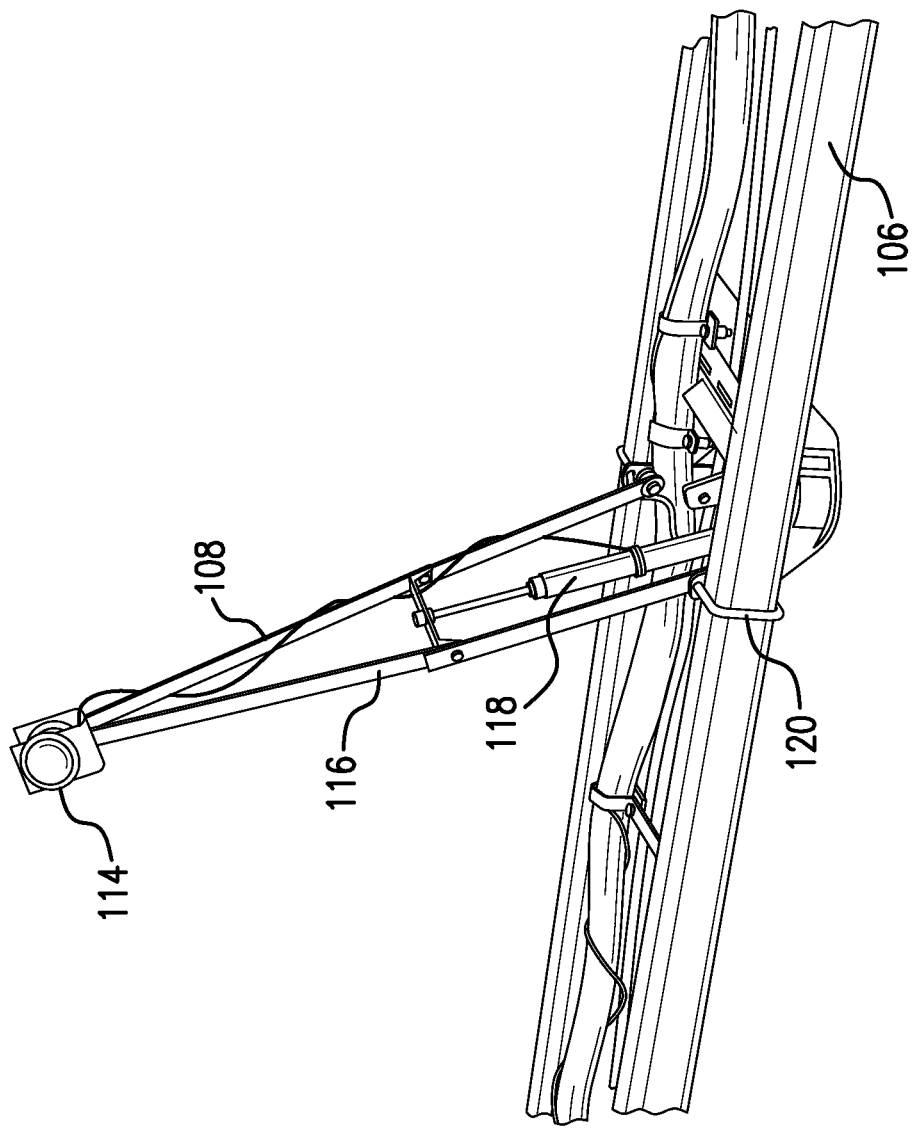
FIG. 4 shows a close up side perspective view of the dump truck safety light device.

FIG. 4 shows a close up side perspective view of the dump truck safety light device 108. The exemplary embodiment of the dump truck safety light device 108 has a safety light 114 coupled at or near one end of an arm 116. The other end of the arm 116 has one or more pivoting attachment points 120 coupled to the trailer reach 106. The dump truck safety light device 108 has an actuator 118 coupled to the arm 116 and to the trailer reach 106.

The actuator 118 is configured for moving the dump truck safety light device 108 from the lowered configuration to the raised configuration. In the exemplary embodiment, the actuator 118 is a pneumatic cylinder, but in other embodiments may be a hydraulic cylinder, electrical servomotor, or some other suitable mechanism. In the exemplary embodiment, the actuator 118 is configured for moving the dump truck safety light device 108 to the raised configuration when the pneumatic system of the trailer 104 is pressurized, and configured for moving the dump truck safety light device 108 to the lowered configuration when the pneumatic system of the trailer 104 is de-pressurized. In other embodiments where the actuator 118 is electrically or hydraulically powered, the actuator 118 is configured for moving the dump truck safety light device 108 to the raised configuration when the respective power source is energized and to the lowered configuration when the respective power source is de-energized. In other embodiments, the actuator 118 may be controlled by a manual switch which the operator uses to raise or lower the dump truck safety light device 108 as he or she desires, as long as the power source for the actuator 118 is energized. In yet other embodiments, an automatic control detects a presence or absence of a condition for raising or lowering the dump truck safety light device 108. For example, the actuator 118 may raise the dump truck safety light device 108 when a sensor detects the dump truck 102 has been put in a forward gear and lowers the dump truck safety light device 108 when the sensor detects the dump truck 102 is in a neutral or reverse gear.

In the exemplary embodiment of the dump truck safety light device 108, the actuator 118 does not pull the arm 116 completely vertical, so that when the actuator 118 is de-energized, the dump truck safety light device 108 will return to the lowered configuration by the force gravity.

In yet other embodiments, the actuator 118 has a spring to pull the dump truck safety light device 108 into the lowered configuration when the actuator 118 is de-energized. In some embodiments with manual or automatic controls, the actuator 118 applies force to move the dump truck safety light device 108 to the lowered configuration.

The safety light 114 is wired to the trailer 104 electrical system. In the exemplary embodiment, the safety light 114 and its wiring are configured for illumination whenever the trailer 104 running lights are illuminated. However, in other embodiments the safety light 114 may be configured with a manual control switch to turn off or on the safety light 114 whenever the operator desires. In other embodiments, the safety light 114 may turn off and on based on other conditions. Such as being on whenever the ignition switch is turned on. The safety light 114 may be configured to emit a constant light or an intermittent strobe light.

The arm 116 has a length selected so that when the dump truck safety light device 108 is in the raised configuration, the safety light 114 is at about eye level for a typical driver in a typical passenger car. In the exemplary embodiment, the arm 116 is 3 feet long, which would put the safety light 114 about 4 feet above ground level, but in other embodiments may have other lengths.

Figure 5:
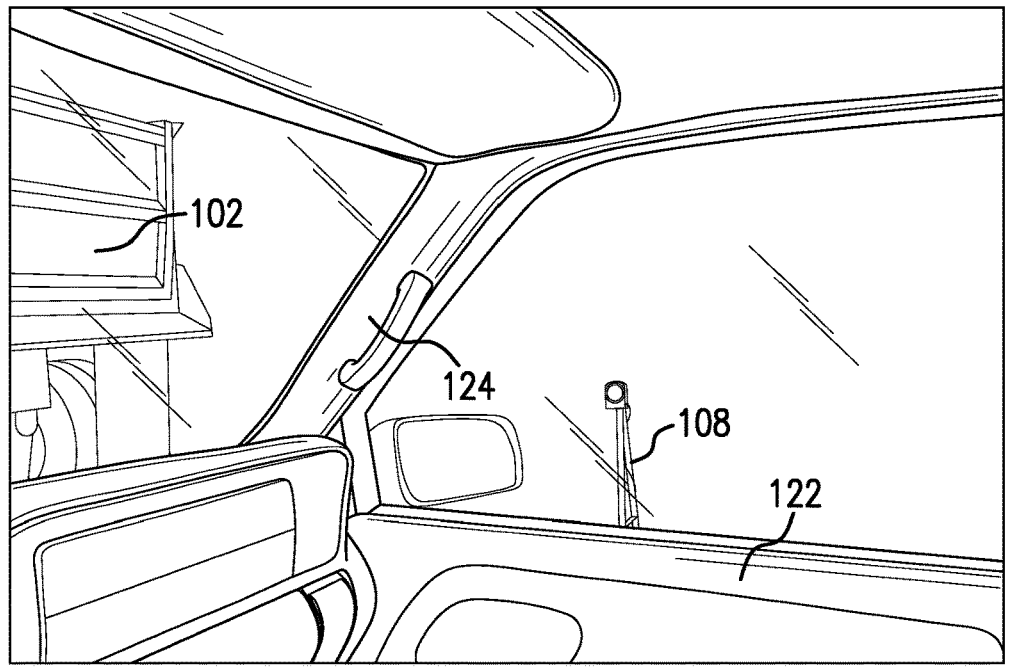
FIG. 5 shows a view out of a passenger door widow of another vehicle that is following slightly behind a dump truck in the next lane to the left, with a dump truck safety light device indicating the presence of a trailer reach.
Figure 6:
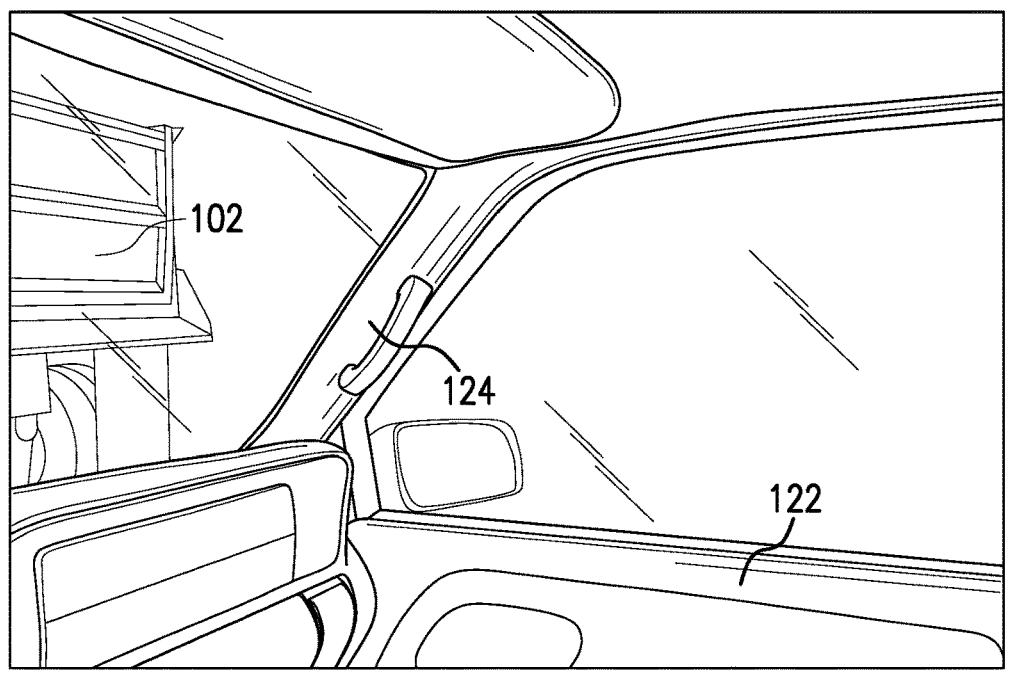
FIG. 6 shows the same view as FIG. 5, but without a dump truck safety light device to indicate the presence of the trailer reach behind the dump truck.

FIG. 5 shows a view out of a passenger door widow of another vehicle 124 that is following slightly behind a dump truck 102 in the next lane to the left, with a dump truck safety light device 108 indicating the presence of a trailer reach 106. The dump truck 102 is pulling a trailer 104 that has a trailer reach 106, but the trailer reach 106 cannot be seen from the driver's seat of the other vehicle 124 because it is in a blind spot created by the passenger door 122 of other vehicle. FIG. 6 shows the same view as FIG. 5, but without a dump truck safety light device 108 to indicate the presence of the trailer reach 106 behind the dump truck 102. The trailer reach 106 is hidden in the blind spot created by the other vehicle passenger door 122 and the trailer 104 is behind the driver's field of view and may be in another blind spot as well.

What is claimed is:

1. A transfer dump truck system comprising:
a dump truck;
a trailer detachably coupled to the dump truck with a trailer reach;
a dump truck safety light device with an arm, a light coupled to one end of the arm and a pivoting attachment point coupled to another end of the arm pivotally coupled directly to the trailer reach, the dump truck safety light device configured to move between a raised configuration and a lowered configuration; and
wherein the trailer reach and the dump truck safety light device are configured such that when the dump truck safety light device is in the lowered configuration, the arm of the dump truck safety light device fits within the trailer reach.

2. The transfer dump truck system of claim 1,
wherein the dump truck safety light device has an actuator;
wherein the dump truck safety light device is configured to move to the raised configuration whenever a power source for the actuator is energized; and
wherein the dump truck safety light device is configured to move to the lowered configuration whenever the power source for the actuator is de-energized.

3. The transfer dump truck system of claim 1,
wherein the dump truck safety light device is configured to move to the raised configuration when the dump buck has been put in a forward gear; and
wherein the dump truck safety light device is configured to move to the lowered configuration when the dump truck is in a neutral or reverse gear.

4. The transfer dump truck system of claim 1,
wherein the arm has a length such that so that when the dump truck safety light device is in the raised configuration, the light is at about four feet above ground level.

5. The transfer dump truck system of claim 1,
wherein the arm is 3 feet in length.

6. The transfer dump truck system of claim 1
wherein the light is configured for illumination based on a position of a control switch.

7. The transfer dump truck system of claim 1,
wherein the light is configured for illumination whenever running lights of the trailer are illuminated.

8. A dump truck safety light device comprising:
an arm;
a light coupled to one end of the arm;
a first pivoting attachment point coupled to another end of the arm and coupled directly to a trailer reach of a trailer, wherein the pivoting attachment point is configured so that the arm pivots about a horizontal axis substantially orthogonal to a longitudinal center line of the trailer reach; and
an actuator coupled to the arm and configured to be coupled to the trailer reach, wherein the actuator is configured to move the arm between a raised configuration and a lowered configuration in which the arm is substantially parallel to the longitudinal center line of the trailer reach.

9. The dump truck safety light device of claim 8,
wherein the actuator is configured to move the arm to the raised configuration whenever a power source for the actuator is energized; and
wherein the actuator is configured to move the arm to the lowered configuration whenever the power source for the actuator is de-energized.

10. The dump truck safety light device of claim 9,
wherein the power source for the actuator is pneumatic.

11. The dump truck safety light device of claim 9,
wherein the power source for the actuator is hydraulic.

12. The dump truck safety light device of claim 9,
wherein the power source for the actuator is electrical.

13. The dump truck safety light device of claim 8,
wherein the arm has a length such that so that when the arm is in the raised configuration, the light is at about four feet above ground level.

14. The dump truck safety light device of claim 8,
wherein the arm is 3 feet in length.

15. The dump truck safety light device of claim 8,
wherein the light is configured for illumination whenever running lights of the trailer are illuminated.

16. The dump truck safety light device of claim 8,
wherein the light is configured for illumination based on a position of a control switch.

17. The dump truck safety light device of claim 8,
wherein the dump truck safety light device is configured such that when the dump truck safety light device is coupled to the trailer reach and the dump truck safety light device is in the lowered configuration, the arm of the dump truck safety light device fits within the trailer reach.

18. The dump truck safety light device of claim 8,
wherein the actuator is configured to move the arm to the raised configuration whenever the actuator is energized; and
wherein the actuator is configured to move the arm to the lowered configuration whenever the actuator is de-energized.

19. A transfer dump truck system comprising:
a dump truck;
a transfer trailer detachably coupled to the dump truck with a trailer reach, the trailer reach comprising a first beam and a second beam with a gap between the beams;
a dump truck safety light device with an arm comprising an A-frame with a first bar and a second bar, a light coupled to the arm, a first pivoting attachment point coupled the first bar and to the first beam, a second pivoting attachment point coupled the second bar and to the second beam, the dump truck safety light device configured to move between a raised configuration and a lowered configuration; and
wherein the trailer reach and the dump truck safety light device are configured such that when the dump truck safety light device is in the lowered configuration, the arm of the dump truck safety light device fits within the gap between the beams of the trailer reach.

20. The dump truck safety light device of claim 19, wherein the actuator is configured to move the arm to the raised configuration whenever the actuator is energized; and wherein the actuator is configured to move the arm to the lowered configuration whenever the actuator is de-energized.

* * * * *